United States Patent [19]

Moggi

[11] Patent Number: 4,501,858

[45] Date of Patent: Feb. 26, 1985

[54] ACCELERATORS FOR VULCANIZING VINYLIDENE FLUORIDE ELASTOMERIC COPOLYMERS

[75] Inventor: Giovanni Moggi, Milan, Italy

[73] Assignee: Montedison S.p.A., Milan, Italy

[21] Appl. No.: 591,994

[22] Filed: Mar. 21, 1984

[30] Foreign Application Priority Data

Mar. 22, 1983 [IT] Italy .............................. 20196 A/83

[51] Int. Cl.[3] .............................................. C08J 3/24

[52] U.S. Cl. .................................. 525/340; 525/326.3

[58] Field of Search ......................................... 525/340

[56] References Cited

U.S. PATENT DOCUMENTS

| | | | |
|---|---|---|---|
| 3,752,787 | 8/1973 | de Brunner | 525/340 |
| 4,243,770 | 1/1981 | Tatemoto et al. | 525/340 |
| 4,259,463 | 3/1981 | Moggi et al. | 525/326.3 |

OTHER PUBLICATIONS

"The Solution Properties of Bis(Triphenylphosphine) Iminium Salts," Palmesen et al., Acta Chem. Scan. A35, 1981, 803-809.

"Reactions of Benzylic Compounds, (etc.)" Maartmen-Mae et al., Acta Chem. Scan., B 36 (1982), 211-223.

*Primary Examiner*—Joseph L. Schofer
*Assistant Examiner*—Bernard Lipman

[57] ABSTRACT

Vulcanization of fluoroelastomers based on vinylidene fluoride by means of a polyhydroxyl aromatic compound, a divalent metal compound of basic nature and an accelerator consisting of a salt of bis(triarylphosphin)-imidinium of general formula:

$$[Ar_3P{=}N{=}P\ Ar_3]_n{}^+ . X^{n-}$$

wherein:
n=1 or 2
Ar=an aryl group
X=a mono- or divalent anion.

4 Claims, No Drawings

ACCELERATORS FOR VULCANIZING VINYLIDENE FLUORIDE ELASTOMERIC COPOLYMERS

BACKGROUND OF THE INVENTION

The vulcanized elastomers based on vinylidene fluoride copolymers are well known and are widely employed in a plurality of applicative fields where an exceptional chemical resistance to solvents, lubricants, fuels, acids and the like, even at very high temperatures, is required.

According to the most advanced art, for the vulcanization of the vinylidene fluoride elastomeric copolymers use is made, as vulcanizing agents, of polynucleofilic compounds and in particular of aromatic polyhydroxyl compounds (or of similar thioderivatives), either as such or in the salified form.

Such products, however, are affected by the drawback of requiring extremely long vulcanization times, wherefore they are employed in combination with substances exerting an accelerating action.

Among the substances which exert an accelerating action according to the most advanced technique there are described derivatives of tertiary amines containing four nitrogen-carbon covalent bonds, and derivatives of tertiary phosphines containing four phosphorus-carbon covalent bonds (French Pat. No. 2,091,806 and No. 2,096,115).

Compounds containing one or more carbon-nitrogen covalent bonds (U.S. Pat. No. 4,259,463) and compounds having the structure of phosphonium ilides (U.S. Pat. No. 3,752,787) are described too. One of the drawback rising from the use of such accelerators is the difficulty in obtaining a perfect homogenization of same in the blend, so that hypervulcanization phenomena or scorching, or undervulcanization phenomena take place, with consequent insufficient and non-homogeneous adhesion of the vulcanized articles to metals.

THE PRESENT INVENTION

It has been now surprisingly found by the Applicant that the compounds having structures of bis(triarylphosphin)-iminium salts (or PPN salts) of general formula $$[Ar_3P{=}N{=}P\ Ar_3]_n{}^+.X^{n-}$$

wherein Ar is an aryl radical, n=1 or 2, X is a monovalent or divalent anion, may be advantageously utilized as vulcanization accelerators for the fluoroelastomers. The positive charge of the cation can be assigned to the N atom, but it can be also equally distributed to two phosphorus atoms.

Such compounds are also referred to as (when Ar=phenyl) nitrido-bis(triphenylphosphine) salts [Z. Anorg. Allgem. Chem. 311 290 (1961)], while the name according to Chem. Abstr. results to be, e.g. for the compound with X=Cl and Ar=phenyl, the following: P,P,P-triphenyl-phosphin-imide N(chloro-triphenylphosphoranyl).

The preparation of salts of this class is broadly described by A. Martinsen and J. Sargstad in Acta Chem. Scand. Sec. A. (1977) 645–650.

Thus, it is an object of the present invention to provide vulcanizable compositions based on elastomeric copolymers of vinylidene fluoride, containing polynucleofilic compounds as vulcanizing agents, which are not affected by the drawbacks mentioned hereinbefore.

Another object is that of providing a process for vulcanizing compositions based on vinylidene fluoride elastomeric copolymers, which is free from the shortcomings cited hereinabove and is capable of providing vulcanized articles exhibiting a high adhesion to metal substrates.

A third object is also that of providing vulcanized compositions based on vinylidene fluoride elastomeric copolymers, free from the drawbacks mentioned in the foregoing, and which may be shaped by injection molding.

These and still further objects are achieved by compositions comprising:

(I) 100 parts by weight of a vinylidene fluoride elastomeric copolymer, with one or more fluorinated or chlorofluorinated ethylenically unsaturated monomers, such as e.g. 1-hydropentafluoropropene; 2-hydropentafluoropropene; 1,1-dihydrotetrafluoropropene, partially or thoroughly fluorinated alkyl- and arylvinylethers, and the like;

(II) 1–40 parts by weight of an inorganic acid acceptor, consisting of one or more basic oxides of divalent metals, selected from the group comprising magnesium oxide, calcium oxide, lead monoxide, zinc oxide and/or of one or more basic lead phosphites, optionally in the form of cationic complexes or chelates;

(III) 0.5–10 parts by weight of one or more basic compounds, selected from the group comprising the calcium, strontium and barium hydrates, the metal salts of weak acids such as carbonates, benzoates and phosphates of calcium, strontium, barium, sodium and potassium, optionally in the form of complexes with the normal cationic chelating and complexing agents of the type well known to those skilled in the art;

(IV) 0.5–15 and preferably 1–6 parts by weight of a vulcanizing agent based on one or more polyhydroxyl and/or polythiol compounds of general formulas $$A(BC)_n$$

and/or $$CH{-}R{-}BC$$

in which A is an arylene radical, n is an integer equal to or higher than 2, B is oxygen or sulphur; C is hydrogen or an alkaline metal, R is an alkylene or cycloalkylene, mono- or polyalkylenecycloalkyl, or alkylenediaryl or oxoalkylenediaryl radical;

(V) 0.05–5 parts of a vulcanization accelerator as described hereinabove.

The vulcanizable compositions of the type specified hereinabove are vulcanized by means of a process, which too is an object of the present invention, that consists in first heating said compositions, under pressure, to temperatures in the range from 130° C. to 230° C., preferably from 160° C. to 200° C., during a time from 0.5 to 60 and preferably from 1 to 20 minutes; the articles so obtained are successively postvulcanized in an oven or a furnace, at atmospheric pressure, at temperature ranging from 130° C. to 315° C., preferably from 200° C. to 275° C., for a period of time from 5 to 48 and preferably from 10 to 24 hours.

It has surprisingly been ascertained that the vulcanizable compositions according to this invention can be transformed into articles of any shape and size by extrusion molding and subsequent vulcanization, employing also highly automatized injection technologies; in fact, at the high temperatures which are usual for the injection molding process, no drawbacks occur due to scorching or hot tearing phenomena.

Such articles exhibit an excellent resistance to permanent set and to compression, a minimum tendency to scorching as a function of the storing time and temperature or of the temperatures of particular processing technologies, such as for example the extrusion, and also a high resistance to thermal ageing; furthermore, they can be bonded to metal substrates of different types, to which they exhibit a considerable adhesion even at high temperatures.

It was also observed that the vulcanizable compositions, including the additives from (I) to (V) cited hereinbefore, do not give rise to tackiness or soiling phenomena of the molds, wherefore production rejections are practically absent, so allowing high production standards and highly regular processing cycles.

The process according to the present invention is particularly suitable in the case of copolymers containing from 30 to 70% by moles of vinylidene fluoride and from 70 to 30% by moles of 1-hydropentafluoroprene and/or hexafluoropropene, or in the case of vinylidene fluoride/tetrafluoroethylene/hexafluoropropene and-/or 1-hydropentafluoropropene terpolymers, in which the percent amounts of the three monomers respectively range from 40 to 80, from 30 to 10 and from 30 to 10% by moles.

More in general, the process according to the present invention is advantageously utilizable for all the fluorinated polymeric materials of the elastomeric type, optionally containing substituents other than fluorine and chlorine, and also for the mixtures of two or more fluorinated elastomers.

The polyhydroxyl or polythiol compounds to be used as vulcanizers conforming to this invention are those well known in the art. Particularly suitable are hydroquinones, resorcin, catechol, naphthols, polyhydroxybenzophenones, bisphenols and derivatives thereof containing in the aromatic ring and/or in the aliphatic group (R=alkylenediarylene group) substituents different from hydrogen and in particular halogens such as chlorine and fluorine, and corresponding thiol-derivatives, either as such or monosalified, bisalified or polysalified with alkaline metals; lower aliphatic and cycloaliphatic diols, such as 1,4-butandiols; dialkylenecycloaliphatic diols, such as 1,4-dihydroxymethyl-cyclohexane and dialkylenearomatic diols, such as 1,4(dihydroxymethyl)benzene and corresponding thiol-derivatives, either as such or mono- or bisalified with alkaline metals.

Preferred compounds to be used according to the present invention as vulcanization accelerators are:

A 1=$[(C_6H_5)_3P]_2NCl$
M.P.=260° C.
Bis(triphenylphosphin)iminiumchloride

A 2=$[(C_6H_5)_3P]_2NNO_3$
M.P.=227° C.
Bis(triphenylphosphin)iminiumnitrate prepared according to the teachings of J. K. Ruff and W. J. Schlientz in "Inorganic Synthesis" vol. 15, (1974), page 85;

A 3=$[(C_6H_5)_3P]_2NBr$
M.P.=256° C.
Bis(triphenylphosphin)iminiumbromide

A 4=$[(C_6H_5)_3P]_2NI$
M.P.=254° C.
Bis(triphenylphosphin)iminiumiodide the last two compounds having been prepared according to the method described by R. Appel and A. Hauss "Zeit.Anorg.Allg. Chem." 311, 290, (1961);

A 5=$[(C_6H_5)_3P]_2NBF_4$
Bis(triphenylphosphin)iminiumtetrafluoroborate;

this compound is prepared from equimolar amounts of A 1 and of sodium tetrafluoroborate in aqueous solution. The product precipitates in the form of very fine white crystals having a melting point of 233° C.;

A 6=$[(C_6H_5)_3P]_2NB(C_6H_5)_4$
Bis(triphenylphosphin)iminiumtetraphenylborate.

It is prepared in like manner as the preceding product, but using an aqueous solution of potassium hexafluorophosphate; white crystals having a melting point of 216° C.

The accelerator amount to be employed in the process according to the present invention, though remaining in the range allowed by the high solubility of the additive in the fluorinated elastomer, depends on whether or not steric hindrances are present in the additive, on the basicity degree of the vulcanizable composition and on many other factors connected with the other particular additives utilized, on the type, shape and dimensions of the article to be manufactured, on the vulcanization conditions and on the heating system and modalities during vulcanization.

The vulcanizable compositions according to the present invention may contain, in addition to the substances indicated hereinbefore from (I) through (V), carbon black, white and coloured fillers, plasticizers and lubricants already known, such as stearates, arylphosphates, polyethers, polyesters, polyethylene and other known additives, according to the techniques usually employed by the fluorinated elastomers users.

The components of the vulcanizable compositions of the present invention are easy to incorporate into the vinylidene fluoride elastomeric copolymer, both separately and premixed, or they may be solubilized in solvents and then caused to be adsorbed on inert fillers having a large surface area, without giving rise to any undesired accompanying phenomenon, such as surface efflorescence, caused by migration phenomena inside the vulcanizable composition, due to the high compatibility with the elastomer.

In this way it is possible to reach good vulcanization rates at the usual processing temperatures without encountering, however, any risk of scorchings (prevulcanization) in the preliminary processing steps prior to the actual vulcanization.

Finally, another advantage according to the present invention consists in the complete elimination of the undesired "back rinding" phenomena during vulcanization in closed mold and under pressure of articles prepared from fluorinated elastomers, particularly in the case of O-ring gaskets.

According to a preferred embodiment of the process according to the present invention, the mixture of bis(-triarylphosphin)-iminium salt (0.1–2 parts by weight) and of vulcanizing agent (1–6 parts by weight) is additioned in the fluorinated elastomer (100 parts by weight), before adding the acid acceptor (2–10 parts by weight), with the basic compounds (1–7 parts by weight), the reinforcing and inert fillers, the lubricants, the plasticizers and other optional additives.

By operating in this manner, a quick, controlled and uniform vulcanization is obtained, without any risk of undesired phanomena, such as scorchings during the various processing steps of the mix or during the storage thereof. Similarly, any risk of losses due to volatilization during preparation and storage of the vulcanizable compositions; furthermore, no special measures are to be taken by the personnel in charge of the processing steps, thanks to the high consistency of the salts (PPN) and the elastomer with each other.

The fluorinated elastomers obtained from the compositions of the present invention are utilizable as sealing gaskets, in both static and dynamic conditions, in the motorized, mechanical, naval fields, as protective garments for the contact with aggressive chemical agents, as sheaths which protect electrical cables when exposed to an intense thermal radiation, and in other similar appliances.

The following examples are given only to the purpose of better illustrating the present invention, and are not to be considered as in any way limitative of the invention.

EXAMPLES 1–3

Different vulcanization blends containing some polyhydroxyl vulcanizing agents were prepared. In all blends, the accelerator utilized was the type A 1 described hereinbefore.

There was employed the fluorinated elastomer known as Tecnoflon NML (trademark of Montefluos relating to an elastomeric copolymer of vinylidene fluoride with hexafluoropropene in a 4:1 molar ratio, having a Mooney ML viscosity (1+4) at 100° C.=55 and a specific gravity at 25° C.=1.816 g/cm³).

EXAMPLES 4–8

Different vulcanization blends containing different accelerators described hereinbefore were prepared. In all blends bisphenol AF was used as vulcanizing agent.

The fluorinated elastomer known in commerce as Tecnoflon NM (a Montefluos trademark relating to an elastomeric copolymer of vinylidene fluoride with hexafluoropropene in a 4:1 molar ratio, having a Mooney ML viscosity (1+4) at 100° C.=85 and a specific gravity at 25° C.=1.816 g/cm³) was used.

TABLE 1

| Formulation No. | | 1 | 2 | 3 |
|---|---|---|---|---|
| Tecnoflon NML | parts by weight | 100 | 100 | 100 |
| Maglite D | " | 5 | 5 | 5 |
| $Ca(OH)_2$—VE(1) | " | 5 | 5 | 5 |
| Carbon black MT | " | 30 | 30 | 30 |
| Bisphenol A | " | 2,3 | — | — |
| Bisphenol AF | " | — | 1,8 | — |
| Sulphondiphenol | " | — | — | 2,4 |
| $A_1$ | " | 0,6 | 0,6 | 0,65 |
| Thermo-mechanical characteristics O.D.R. at 175° C.(3) | | | | |
| Minimum torque Inch/lbs. | | 16 | 17 | 15 |
| $T_2$ minutes(2) | | 5,2 | 3,2 | 5,0 |
| $T_{50}$ minutes(3) | | 8,2 | 5,6 | 9,8 |
| Maximum torque Inch/lbs. | | 90 | 115 | 100 |
| Viscosity Mooney MS at 121° C.(4) | | | | |
| minimum | | 46 | 40 | 42 |
| minutes for a 10-point increase | | 45 | 65 | 60 |
| Vulcanization | | | | |
| in press at 170° C. for 10 minutes in oven at 250° C. for 16 hours | | | | |

TABLE 1-continued

| Formulation No. | 1 | 2 | 3 |
|---|---|---|---|
| Modulus at 100% elong. Kg/cm²(5) | 60 | 75 | 65 |
| Tensile strength Kg/cm²(5) | 125 | 170 | 145 |
| Elongation at break %(5) | 200 | 210 | 150 |
| Hardness, IRHD(6) | 71 | 73 | 73 |
| Compression set O-Rings (Ø 25,4 × 3,53 mm)(7) | | | |
| at 200° C. for 70 hours | 29 | 12 | 22 |
| at 200° C. for 168 hours | 39 | 20 | 40 |
| After thermal treatment at 275° C. for 70 hours | | | |
| %-variation of 100% modulus | +15 | 0 | +22 |
| %-variation of tensile strength | −20 | −16 | −16 |
| %-variation of elongation | −17 | 0 | −5 |
| variation of hardness, in points | +3 | 0 | +1 |

Remarks to Table 1

(1) Trademark of Sturge Ltd. (Great Britain)

(2) Time in minutes required to obtain an increase in the minimum value of 2 inch/lbs.

(3) Time in minutes required to obtain a torque of 50 inch/lbs.

(3) According to ASTM D 2705-68 T, using an oscillating disk rheometer (biconic disk)

(4) According to ASTM D 1646-63, using a small size rotor (5) According to ASTM D 412-62 T, on 2-mm thick test pieces (6) According to ASTM D 1415-68, on 6-mm thick test pieces, reading after 30 seconds (7) According to ASTM D 395-61, method B.

TABLE 2

| Formulation No. | | 4 | 5 | 6 | 7 | 8 |
|---|---|---|---|---|---|---|
| Tecnoflon NM | parts by weight | 100 | 100 | 100 | 100 | 100 |
| Maglite D | parts by weight | 5 | 5 | 5 | 5 | 5 |
| $Ca(OH)_2$—VE(*) | parts by weight | 5 | 5 | 5 | 5 | 5 |
| Carbon black MT | parts by weight | 25 | 25 | 25 | 25 | 25 |
| Bisphenol AF | | 1,7 | 1,7 | 1,7 | 1,7 | 1,7 |
| $A_2$ | parts by weight | 0,6 | — | — | — | — |
| $A_3$ | parts by weight | — | 0,65 | — | — | — |
| $A_4$ | parts by weight | — | — | 0,7 | — | — |
| $A_5$ | parts by weight | — | — | — | 0,8 | — |
| $A_6$ | parts by weight | — | — | — | — | 0,7 |
| Thermo-mechanical characteristics O.D.R. at 175° C. | | | | | | |
| Minimum torque Inch./lbs. | | 20 | 19 | 18 | 21 | 22 |
| $T_2$ minutes | | 2,5 | 2,7 | 2,9 | 2,6 | 3,6 |
| $T_{50}$ minutes | | 4,9 | 5,2 | 5,3 | 4,8 | 6,8 |
| Maximum torque Inch/lbs. | | 110 | 105 | 100 | 115 | 100 |
| Viscosity Mooney MS at 121° C. | | | | | | |
| minimum | | 55 | 65 | 60 | 45 | 50 |
| Vulcanization in press at 170° C. for 10 minutes in oven at 250° C. for 16 hours | | | | | | |
| Modulus at 100% elong. Kg/cm² | | 70 | 65 | 65 | 70 | 75 |
| Tensile strength Kg/cm² | | 160 | 165 | 160 | 135 | 140 |
| Elongation at break % | | 210 | 195 | 200 | 190 | 175 |
| Hardness; IRHD | | 68 | 70 | 70 | 69 | 68 |
| Compression set O-rings (Ø 25,4 × 3,53 mm) | | | | | | |
| at 200° C. for 70 hours | | 14 | 12 | 15 | 16 | 16 |
| at 200° C. for 168 hours | | 19 | 21 | 28 | 19 | 21 |

(*)commercial Trademark of Sturge Ltd. (Great Britain)

What I claim is:

1. A vulcanizable fluoroelastomeric composition, comprising:

(A) a copolymer of elastomeric nature based on vinylidene fluoride and of at least another fluorinated monomer, (B) a substance having the property of neutralizing acids, selected from amongst the oxides of divalent metals, the hydroxides of divalent metals and mixtures of such oxides and hydroxides with metal salts of weak acids, (C) a polyhydroxyl aromatic compound suited to act as a vulcanizing agent for the copolymer, and characterized in that it contains, as a vulcanization accelerator, a compound having the structure of bis(-triarylphosphin)-iminium salt of general formula:

$$[Ar_3P{=}N{=}N\ Ar_3]_n^{+}.X^{n-}$$

wherein Ar is an aryl radical, n=1 or 2, X is a monovalent or divalent anion.

2. The vulcanizable fluoroelastomeric composition according to claim 1, in which X is tetrafluoroborate.

3. The vulcanizable fluoroelastomeric composition according to claim 1, in which X is tetraphenylborate.

4. Manufactured articles comprising vulcanized fluoroelastomers obtained starting from the compositions of claim 1.

* * * * *